Figures 1, 2:
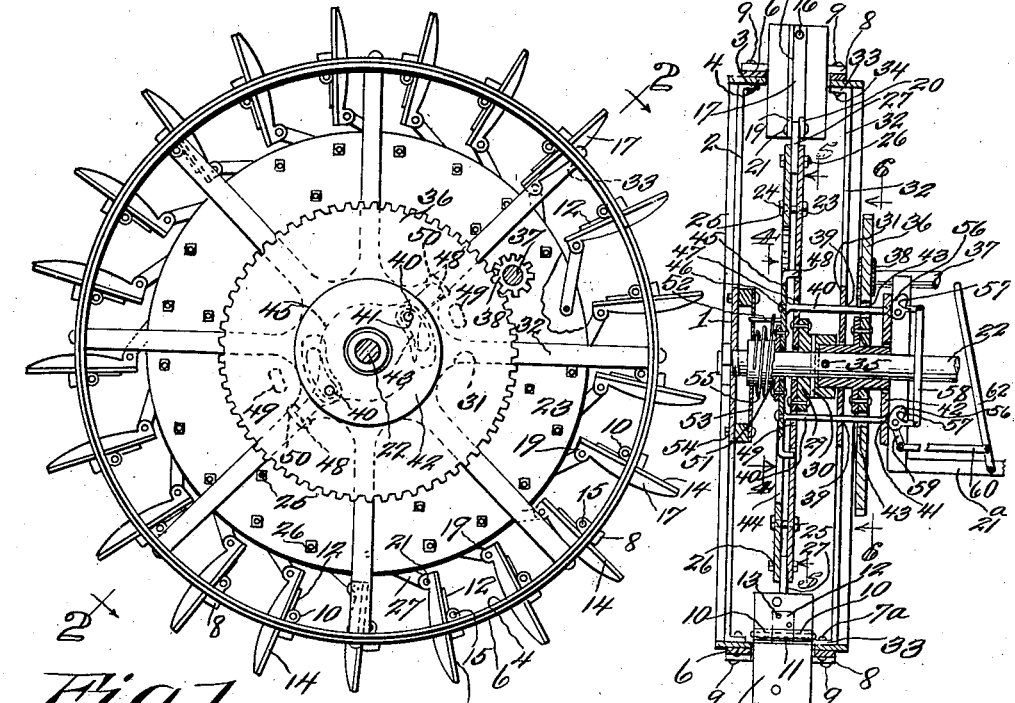

L. H. NOAH.
TRACTION WHEEL.
APPLICATION FILED MAR. 20, 1920.

1,376,896.

Patented May 3, 1921.
2 SHEETS—SHEET 1.

Inventor
L. H. Noah,
By Watson E. Coleman
Attorney

L. H. NOAH.
TRACTION WHEEL.
APPLICATION FILED MAR. 20, 1920.

1,376,896.

Patented May 3, 1921.
2 SHEETS—SHEET 2.

Inventor
L. H. Noah,
By Watson E. Coleman
Attorney

UNITED STATES PATENT OFFICE.

LEROY H. NOAH, OF PALCO, KANSAS, ASSIGNOR OF ONE-FOURTH TO JOSEPH E. ROBESON AND ONE-FOURTH TO RAYMOND E. TEALL, BOTH OF PALCO, KANSAS.

TRACTION-WHEEL.

1,376,896.  Specification of Letters Patent.  Patented May 3, 1921.

Application filed March 20, 1920. Serial No. 367,438.

*To all whom it may concern:*

Be it known that I, LEROY H. NOAH, a citizen of the United States, residing at Palco, in the county of Rooks and State of Kansas, have invented certain new and useful Improvements in Traction-Wheels, of which the following is a specification, reference being had to the accompanying drawings.

This invention relates to an improved traction wheel, particularly adapted for use in connection with tractors. It has been found that the present form of tractor wheels not only tear up the road beds, but also do not have sufficient grip on the road bed in order for pulling against loose dirt, mud and the like, and an object of the invention is to provide a tractor wheel wherein the tractor elements are movable to collapsed positions with relation to the rim of the wheel, when the wheel is traveling upon road beds, thereby avoiding destroying the surface of the road, and may be automatically extended by the power of the tractor, so as to grip into sandy or muddy road beds or in the fields so as to propel the tractor forward.

Another object of the invention consists in the provision of a novel form of construction for supporting the tractor members on the wheel, whereby they may be collapsed or extended.

A further object is the provision of means for retaining the tractor elements in extended radial or collapsed positions in combination with a mechanism for actuating said retaining means to release the tractor elements so that they may be actuated to extended or collapsed positions.

A still further object consists in the provision of means actuated by the power of the tractor for moving the tractor elements to extended positions, and when said means is reversed in its movement, the tractor elements may be collapsed, the collapsing of said elements being materially assisted by the weight of the machine.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figures 3, 4:
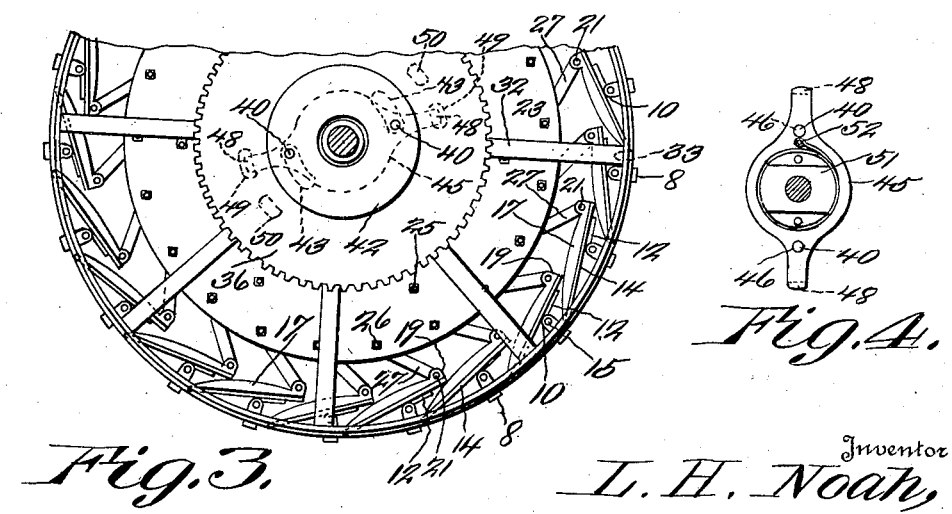
Figure 5:
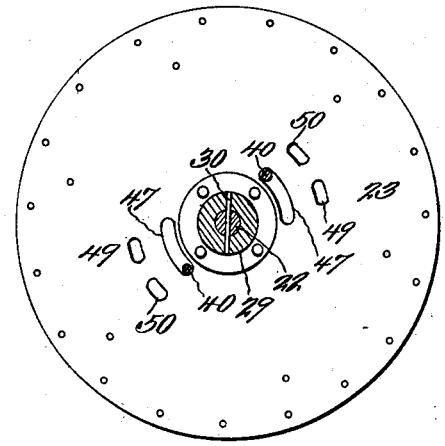
Figure 6:
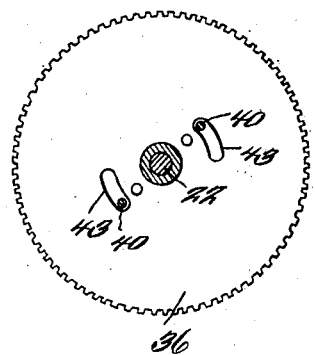
Figure 7:
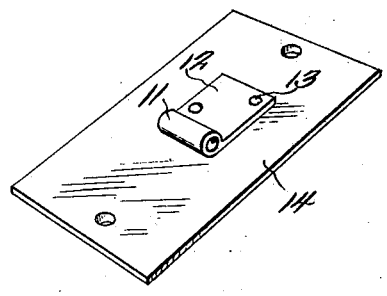
Figure 8:
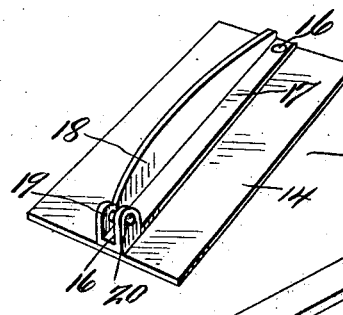
Figure 9:
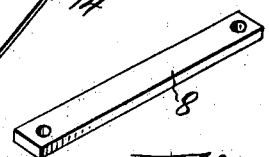
Figure 10:
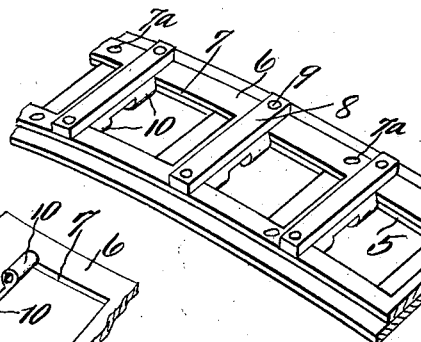
Figure 11:
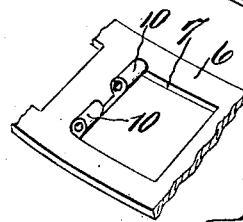

In the drawings:

Figure 1 is a view in side elevation of a tractor wheel constructed in accordance with the invention, Fig. 2 is a sectional view on line 2—2 of Fig. 1 showing the means for releasing movable supporting means for the tractor elements, whereby said elements may be either extended or collapsed, Fig. 3 is a view in elevation of the improved tractor wheel showing the tractor elements collapsed, Fig. 4 is a sectional view on line 4—4 of Fig. 2, showing the axle and the movable tractor element supporting means removed, Fig. 5 is a view on line 5—5 of Fig. 2, Fig. 6 is a view on line 6—6 of Fig. 2, Fig. 7 is a detail perspective view of one of the tractor elements, Fig. 8 is a detail perspective view of one of the tractor elements showing its other face, and illustrating the angle brace member therefor, Fig. 9 is a detail view of one of the transverse tractor strips of the rim of the wheel, Fig. 10 is a detail view in perspective of a portion of the rim of the tractor wheel showing the transverse tractor strip, and Fig. 11 is a view of a portion of a band, which surrounds the outer surface of the rim of the wheel.

Referring more especially to the drawings, 1 designates a wheel plate provided with radial spokes 2, the outer angle ends of which have lateral ears, which are secured at 3 to the rim 4 of the wheel. This rim 4 is provided with a plurality of openings 5. A band 6 is riveted or otherwise secured as at 7ª to the rim. This band 6 is also provided with a plurality of openings 7. Arranged at intervals adjacent the band 6 is a plurality of transverse ribs or plates 8, which are arranged adjacent certain of the edges of the openings 7. These transverse plates or ribs 8 are riveted or otherwise secured at 9 to the band 6 and these rivets 9 also pass through the rim 4, thereby also securing the band to the rim. Certain transverse edges of the openings 7 of the band 6 are provided with hinge rolls 10 between which the hinge rolls 11 of the hinge plates 12 (which are secured at 13 to the tractor elements 14) are pivotally mounted by means of the usual hinge pins 15 as shown in Fig. 1. The tractor elements are mounted to move in the openings 5 and 7 of the rim and the band. The openings 5 of the rim are narrower than the openings 7, and it is to be noted that the band is disposed on the rim so that certain edge portions of the openings 5 will protrude beyond certain corresponding edge portions of the openings 7 at positions opposite the hinge connections of the tractor wheel elements so that when the tractor elements are collapsed, their outer edge portions will partially countersink within the openings 7 at points opposite the hinge connections. Secured as at 16 to the tractor elements are braces 17. These braces are angular in cross section as shown, and the flanges 18 at certain of their ends terminate in ears 19, adjacent which are opposite ears 20. These ears 19 and 20 receive pivot pins 21.

Referring to Fig. 2 it will be noted that a portion of a tractor frame 21ª is illustrated, and also a part of the drive shaft 22. The tractor wheel is carried by the drive shaft 22 and comprises the concentrically arranged opposed plates 23 and 24, which are bolted together as at 25. Additional bolts 26 pass through the concentric opposing plates near their marginal edges, and pivotally mounted on said bolts 26 are links 27 which in turn are pivotally mounted upon the pivot pins 21 of the tractor element. These opposing concentric plates are movable relatively to the rim of the wheel and when moved, they constitute means to move the tractor elements to extended positions, or to collapsed positions as shown in Figs. 1 and 3 of the drawings. Bolted or riveted or otherwise secured to the plate 23 is a hub member 29, which is pinned to the drive shaft 22 by means of the dowel pin 30. The tractor wheel is provided with an additional wheel plate 31 provided with radial spokes 32 having their outer ends terminating in right angular lugs 33, which are bolted at 34 to the rim and the band 6. Carried by the drive shaft 22 and fixed thereto as at 35 is the hub of the drive gear 36. A shaft 37 adapted to be driven by any suitable power is provided, and rotatable therewith is a gear 38 which meshes with the gear 36, so as to impart movement to the drive shaft 22. Mounted in guide openings 39 of the wheel plate 31 are pins 40. These pins 40 are secured at 41 to a disk plate 42. The center of the plate 42 has an opening which fits the hub of the drive gear 36. The pins 40 pass through arcuate slots 43 of the drive gear 36, so that it is possible for the drive gear to move partially without being interrupted by the pins 40. The plate 24 is in the form of a ring as shown, therefore its opening 44 is large enough to permit of the use of the yoke 45. This yoke 45 is disposed adjacent the plate 23, and is secured in any suitable manner as at 46 to the outer ends of the pins 40, so that the yoke is movable with the pins, and since the pins are movable with the wheel so is the yoke 45. The pins 40 pass through arcuate slots 47 of the plate 23 of the wheel. The yoke at diametrically opposite portions is provided with projections, the ends of which terminate in lugs 48, which normally engage through one set or the other of the openings 49 and 50 of the plate 23, thereby holding the plate in different adjusted positions, according to the position of the tractor elements. The yoke 45 is provided with a boss 51 on one face, and also a laterally projecting pin 52. This pin passes transversely through the plate 53, which is bolted or otherwise secured at 54 to the wheel plate 1. A coil spring 55 is coiled about the boss 51, and is interposed between the yoke and the plate 53, and acts to hold the lugs 48 in either set of the openings 49 and 50, to hold the tractor elements collapsed or extended. One end of the coil spring 55 is formed into an eye which engages the pin 52, thereby retaining the coil spring in place and also to reduce the rattling of the spring between such parts of the wheel to a minimum.

Cam members 56 are pivotally mounted on the tractor frame 21ª and are provided with laterally extending arms 57, which are connected by the link 58, so that both cams can move together when one is operated. An arm 59 is carried by one of the cams and has a link 60 connected thereto, which in turn is connected to the lever 62 mounted upon the tractor frame so that by moving the lever in one direction, causing the cams to apply pressure upon the plate 42, the pins 40 will be moved outwardly, causing the lugs 48 to disengage certain of the openings 49 and 50, and then by power being transmitted to the gear 36, the plates 23 and 24 will move relatively to the rim, and through the connection with the tractor elements said elements will be moved radially in positions, so that the wheel may take hold in sandy, muddy or otherwise bad road beds, in order to cause the tractor to move and travel very rapidly and without slipping. When the plates 23 and 24 are moved in the opposite direction the tractor elements may be collapsed to the position shown in Fig. 3. In this case the lugs of the yoke will disengage from the openings 50 and by movement of the gear 36 in a reverse direction, the tractor elements may be collapsed, which will be assisted considerably by the weight of the tractor.

The invention having been set forth, what is claimed as new and useful is:

1. In a tractor wheel, the combination with a rim provided with spaced openings, of blade tractor elements pivotally mounted in said openings, means concentric with and carried by the wheel and being connected to said tractor elements for moving them to radial or collapsed positions, and means for locking said tractor elements, said means comprising a yoke guidable concentric with the wheel and having means to engage certain of said plates, to hold the tractor elements either radially extended or collapsed, spring means for said yoke, and manually operated cam means coöperatively connected with said yoke for moving the yoke.

2. In a tractor wheel, the combination with a rim having tractor elements movable to radial tractor positions or to collapsed positions, of means movable with the wheel when in action, but movable relatively to the rim and having connections with the tractor elements for adjusting them to radial tractor positions, and a locking device for said means to hold the tractor elements in extended or collapsed positions.

3. In a tractor wheel, the combination with a rim provided with a plurality of tractor elements movable to radial or collapsed positions relative to the rim, means movable with the wheel and being movable relatively to the rim and having connections with said tractor elements for changing their positions, a locking device for said means, said locking device comprising a spring tensioned yoke carried by said means and being movable laterally relative thereto and means carried by the wheel and connected to the yoke for imparting lateral movement to the yoke to permit the tractor element actuating member to be moved.

In testimony whereof I hereunto affix my signature.

LEROY H. NOAH.